United States Patent [19]

Swisher

[11] Patent Number: 4,523,726
[45] Date of Patent: Jun. 18, 1985

[54] ANTI-REVERSE MECHANISM

[75] Inventor: Steven L. Swisher, Tulsa, Okla.

[73] Assignee: Brunswick Corporation, Skokie, Ill.

[21] Appl. No.: 539,315

[22] Filed: Oct. 5, 1983

[51] Int. Cl.³ ............................................. A01K 89/01
[52] U.S. Cl. .................................. 242/84.2 R; 74/576;
242/84.5 A
[58] Field of Search .................... 242/84.5 A, 84.51 A,
242/84.51 R, 84.2 A, 84.5 R, 84.2 R, 84.1 R,
84.21 A; 188/82.3, 82.34, 82.4; 74/576

[56] References Cited

U.S. PATENT DOCUMENTS

| | | | |
|---|---|---|---|
| 2,964,257 | 12/1960 | Hull | 242/84.2 A X |
| 3,670,855 | 6/1972 | Lemery | 188/82.3 |
| 4,163,529 | 8/1979 | Egasaki et al. | 242/84.21 R |
| 4,332,359 | 6/1982 | Neufeld | 242/84.2 A |
| 4,376,518 | 3/1983 | Gifford et al. | 242/84.5 A X |
| 4,408,728 | 10/1983 | Pittman | 242/84.2 A |

Primary Examiner—Stuart S. Levy
Assistant Examiner—Katherine Jaekel
Attorney, Agent, or Firm—John G. Heimovics; William E. Recktenwald

[57] ABSTRACT

An improvement in an anti-reverse assembly of the type having a pivotable, planar pawl with a tooth engaging a ratchet associated with a rotatable crankshaft to prevent reverse rotation of the crankshaft. A pocket is provided by spaced walls integrally carried by a portion of the reel housing, within which pocket the pawl is pivotally located. A manually operable control member is extended through an opening in, and snap-fit with, the reel housing. The control member has a leg which overlaps the plane of the pawl to prohibit the escape of the pawl from the pocket. The leg has an operative surface which is selectively positionable by rotation of the control member either into or out of direct engagement with an edge on the pawl. When the control member is in engagement with an edge of the pawl, the pawl is locked in the disengaged position.

12 Claims, 8 Drawing Figures

ANTI-REVERSE MECHANISM

DESCRIPTION

1. Technical Field

This invention relates to spin cast style fishing reels and, more particularly, relates to an improved control element for an anti-reverse mechanism in the reel.

2. Background of the Invention

To incorporate a manually controllable anti-reverse capability into a spin cast style fishing reel, a pivotable pawl member is ofttimes employed. Typically, the pawl is assembled integrally with the reel body as by rivets.

Exemplary of such a construction is that shown in U.S. Pat. No. 3,481,554 to Hull. In Hull, a flat L-shaped pawl is provided and is riveted to the deck plate so as to be pivotable about the rivet or stake. One leg of the L is toothed so as to mesh with a pinion gear on the centershaft while the other leg coacts with a pivotable control member having an externally situated control arm. The control member is selectively pivoted in an on or off position whereupon an actuator carried by the crankshaft can either disengage or permit engagement of the pawl and pinion gear.

The principal drawback with the above construction is that an involved process is required to assemble the pawl and control member with the deck plate as well as assembling the actuator member with the centershaft to operate between the centershaft and the pawl.

As an alternative to the above-described construction, a structure shown in Neufeld U.S. Pat. No. 4,359,197 has an additional member between the externally manipulable control member and the pawl. An anti-reverse drag arm, associated with the crankshaft, interacts between the control member and the pawl. The drag arm is frictionally retained to follow the crankshaft and pivots the pawl through an engaging lug. The friction force is overcome by the manually operable control member which either engages or permits disengagement of the pawl with a ratchet associated with the crankshaft.

The problems with the former construction are prevalent also in the latter. Assembly is particularly difficult given the small size of the pawl which must be not only maintained in position but also arranged in conjunction with the cooperating reel elements. Reel assembly may become time consuming and thus expensive.

Other types of reels have pawls pivoted on the deck plate with slide actuators for engaging and disengaging the anti-reverse feature. Such a construction is shown in Kawada U.S. Pat. No. 4,341,366. The drawback with this construction, like the other constructions, is the multiplicity of parts that require individual assembly using tools and manual labor, all of which increase cost.

The present invention is directed to overcoming the problems enumerated above.

DISCLOSURE OF INVENTION

The present invention is an improvement in an anti-reverse assembly for a spin cast fishing reel of the type having a pivotable, planar pawl with a tooth engageable with ratchet teeth associated with a rotatable crankshaft to prevent rotation of the crankshaft. An anti-reverse control member engages directly with the pawl and is manually manipulable through a head portion or knob situated externally of the reel.

It is the principal object of the present invention to simplify the anti-reverse assembly so as to both reduce manufacturing costs and improve the reliability of the reel by reducing the number of component parts.

To facilitate assembly, a pair of spaced walls are formed integrally with the deck plate so as to define a receiving pocket for the flat pawl. Further, a dimple or detent is provided with the pocket for creating a pivot surface for a rounded nose on a tab associated with the pawl. The control member has an elongate leg that is extended through an opening in the reel housing and overlaps the plane of the pawl adjacent to the leg. The pawl need only be located in the slot and the control member slid into position to prohibit escape of the pawl from the deck plate. Thus numerous parts need not be held in operative arrangement during the assembly process as is required with the prior art reels.

Further, the leg of the control member coacts directly with the pawl, which is pivoted between two positions by rotation of the control member within the opening in the housing. Thus, positive control of the pawl is accomplished and the possibility of malfunction substantially reduced. The pawl is engaged by an actuator member frictionally carried by the crankshaft so that rotation of the crankshaft will either engage or disengage the anti-reverse pawl when the control member is in one position and will permit free rotation of the crankshaft in both directions when the control member is in the second position.

Further, a snap-fit engagement between the control member and reel housing is contemplated. In a preferred form, a pair of spaced elongate legs are formed integrally with the externally situable control head. One of the legs has a reduced cross-sectional area so as to be substantially more flexible than the other leg. The diameter of the opening in the reel housing is chosen so that the one leg will flex toward the more rigid leg upon introduction to the opening. This biases the rigid leg against the walls of the housing interiorly of the opening, thereby amplifying the binding forces between the control member and the walls about the opening. With the control member in a fully seated position, the wall of the housing is closely captured between a lip on the smaller leg and a flat wall associated with the external head. The restoring force on the flexed leg urges the lip behind the inside wall of the housing with the control member in assembled relationship.

DESCRIPTION OF THE BASIC STRUCTURE AND OPERATION OF THE FISHING REEL

Figure 1:
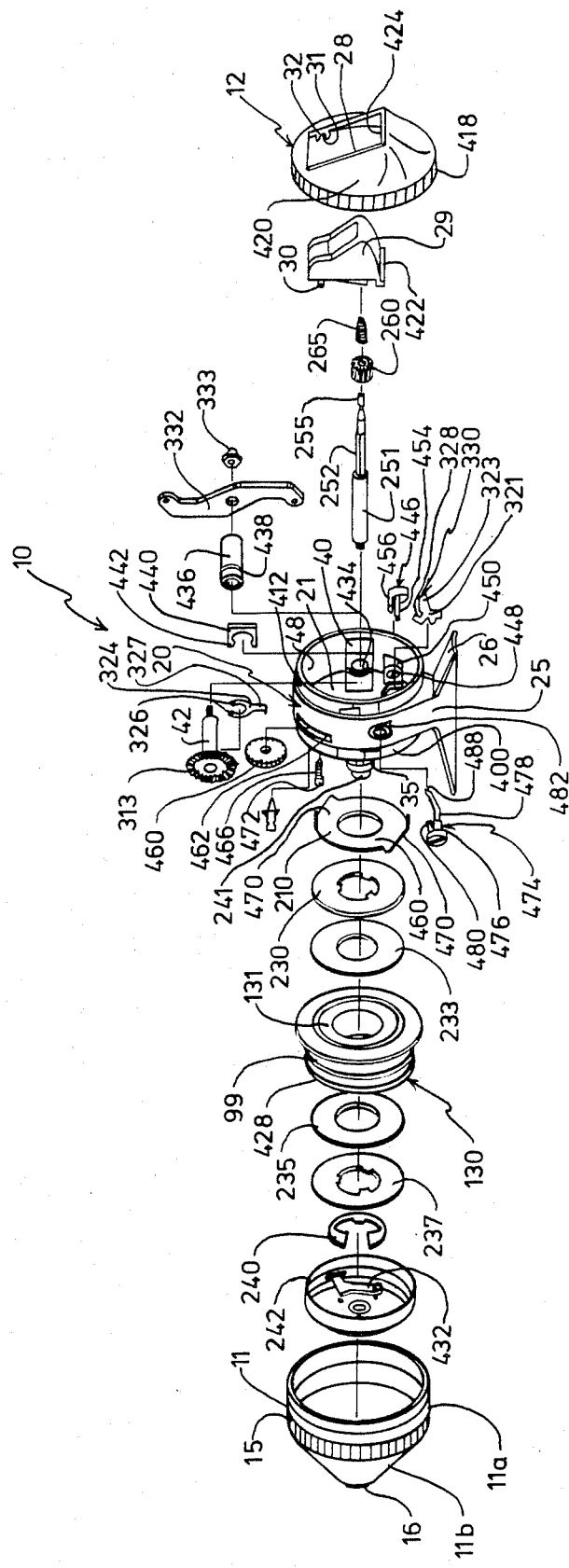
FIG. 1 is an exploded view of a reel embodying the invention.
Figure 2:
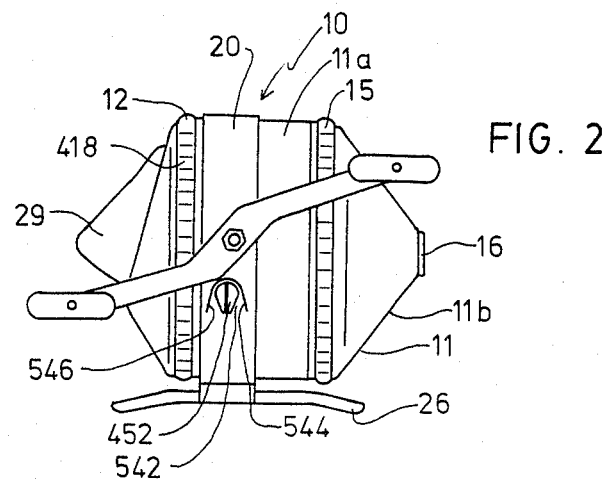
FIG. 2 is a side elevation view of the assembled reel of FIG. 1 as viewed from the side opposite the side shown in FIG. 1.
Figure 3:
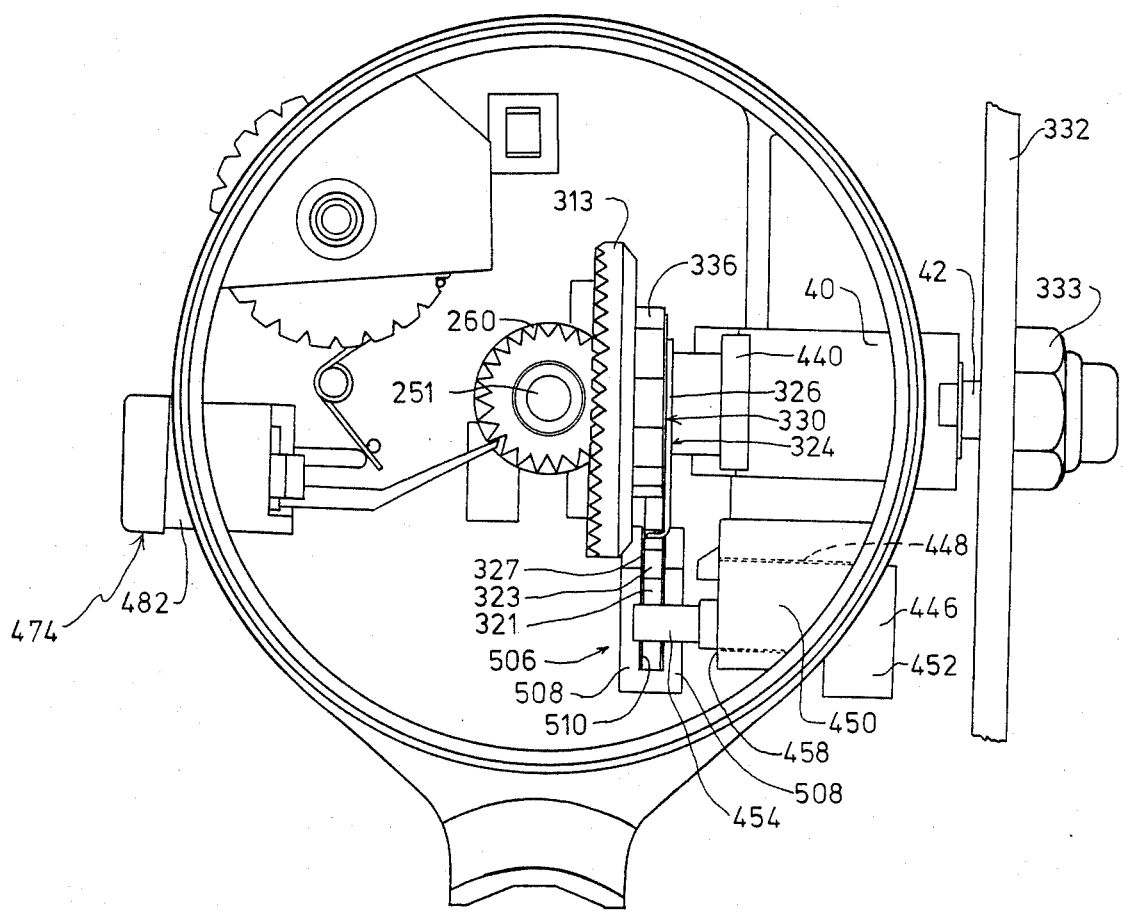
FIG. 3 is a rear, enlarged, sectional view taken along line 3—3 of FIG. 2.

Referring initially to FIG. 1, there is shown a reel 10 including a closed face housing having a reel body 20 to which is attached a front cup-shaped cover 11 and a rear cup-shaped cover 12. The front cover 11 has a cylindrically shaped first part 11a closely surrounding a forwardly opening annular rim 400 on the reel body 20. The front cover tapers radially forwardly from the cylindrical first part 11a to define a cone-shaped second part 11b. A circular line opening is provided in the conical second part 11b and mounts an annular line guide 16 in a conventional manner.

The front cover 11 is removably attached with the reel body 20 in a conventional manner. To facilitate grasping and rotation of the front cover 11 during assembly, a knurled gripping portion 15 is defined on the external surface of the cover 11. The rear cover 12 is removably attachable in a conventional manner with a rearwardly opening rim 412 associated with the back of the reel body 20. A knurled portion 418 is provided on the external surface of the cover 12 to facilitate assembly.

The rear cover 12 has a sloped wall 420 defining a rectangular opening 28 for reception of a one-piece thumb button 29. The thumb button has a shape substantially mating with the shape of the opening 28 in the rear cover 12 and has a pair of sidewardly extending pivots 30 on the upper forward side edges thereof which engage in pivot openings 31 formed in the adjacent side walls 32 of the opening 28. A lip 422 extends laterally along the bottom edge of the thumb button 29. With the thumb button assembled from the inside of the cover 12, the pivots 30 are introduced to the slotted openings 31 in the walls 32 of the rear cover. The lip 422 abuts the edge 424 of the wall defining the bottom of the rectangular opening 28 to prevent the thumb button 29 from pivoting rearwardly out of the opening 28 in the rear cover 12.

The reel body 20 includes a transverse mounting plate or deck plate 21 and has an integrally molded, radially extending stem 25 with a mounting foot 26 on the outer end thereof for attachment to the appropriate part of a fishing rod (not shown).

A central hub 35 is formed with and projects forwardly of the deck plate 21 and receives in succession a drag plate 210, back spool washer 230, back flat drag washer 233, spool assembly 130, front flat drag washer 235, front spool washer 237, all of which are retained on the hub 35 by means of a spool retainer clip 240 which fits into a groove aligned with a shoulder separating the hub 35 from a reduced diameter and cam supporting front portion 241.

A centershaft 251 is slidably and rotatably mounted in a bore extending through the deck plate 21 and hub 35, with a spinner head assembly 242 threaded onto the forward threaded end of the shaft 251. The spinner head assembly 242 partially surrounds the forward flange 428 of the spool assembly 130 with a supply of fishing line 99 being wound on a spool 131 of the spool assembly 130. A pinion gear 260 is splined on a reduced diameter splined portion 252 of the centershaft 251 and is resiliently maintained in a forward position against the deck plate 21 by a centershaft spring 265 bearing against a stop 255 on the centershaft. The splined connection between the pinion gear 260 and centershaft 251 permits the axial sliding motion of the shaft 251 relative to the pinion gear 260 while at the same time rotation of the pinion gear 260 will rotate the centershaft 251.

Depressing the thumb button 29 moves the centershaft 251 and spinner head assembly 242 forward relative to the hub 35 to retract a pickup pin mechanism 432, mounted on spinner head assembly 242. Manipulating the thumb button in a conventional manner will provide a braking action to the line, will permit casting of the line or will permit retrieving the line onto the spool.

The deck plate 21 has a rearwardly projecting boss 40 with a laterally directed bore 434 for reception, in a concentric manner, of a crankshaft 42, surrounded by a cylindrical sleeve bearing 436. The bearing 436 has an annular groove 438 which, with the bearing properly aligned on the reel body 20 is in planar alignment with a slot defined at the rear of the deck plate 21 within a radially inward extension of the boss. A clip 440 surrounds the sleeve bearing 436 and resides within the groove 438, with forwardly projecting legs 442 of the clip 440 entering the slot in the deck plate 21. This arrangement assures proper positioning of the sleeve bearing 436 and prevents any lateral shifting thereof.

The crankshaft 42, with a main pinion gear 313 attached at one end is rotated in the sleeve bearing 436 in the bore 40 and has a handle 332 attached by means of a nut 333 to the other end of said crankshaft 42. The gear 313 meshes with the pinion gear 260 on the centershaft 251 so that rotation of the crank handle 332 will rotate the centershaft 251 and spinner head assembly 242.

An anti-reverse assembly 330, which is associated with the crankshaft 42, includes a ratchet (not shown in FIG. 1) fixed on the back of the gear 313 for rotation with the gear 313 and crankshaft 42. The anti-reverse assembly 330 includes a pivotable pawl 321, a pawl actuator 324 and a control member 446. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the pawl 321. The pawl 321 will be situated with the pawl tooth 323 selectively aligned with the ratchet.

Independent, manual control of the pawl 321 is accomplished by the separate control member 446 mounted within a lateral bore 448 in a boss 450 spaced beneath the boss 40. The control member 446 is manipulable externally of the reel body. Clockwise rotation of the control member 446, as viewed in FIG. 7, will pivot the pawl about the pivot tab 322 out of engagement with the ratchet. Thus movement of the crank handle 332 in either a clockwise or counterclockwise direction by the user, with the pawl 321 manually disengaged by the control member 446, will not effect movement of the pawl 321 and thus clockwise and counterclockwise crankshaft rotation will be uninhibited by the pawl 321.

Figure 8:
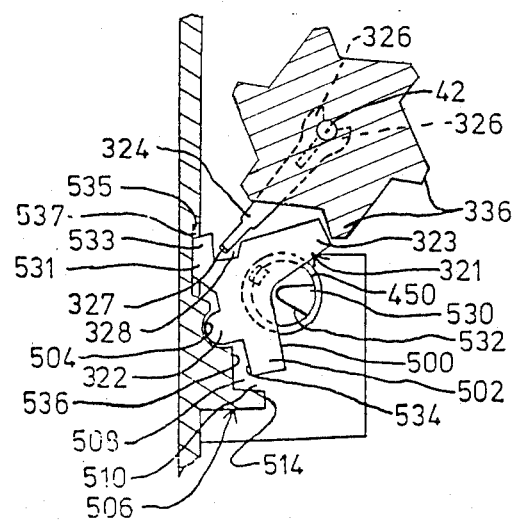
FIG. 8 is a fragmentary, side elevation view of the reel showing the anti-reverse mechanism in the engaged or on position.

Counterclockwise rotation of the control member 446 as viewed in FIG. 8 will allow the pawl 321 to be moved freely between two limiting positions so that rotation of the crank handle 332 in a counterclockwise direction, as viewed in FIG. 8, will pivot the pawl out of alignment with the teeth of the ratchet, whereupon the crank handle 323 will be permitted to be rotated in that direction without interference. In addition, with the control member 446 in the counterclockwise position, rotation of the handle 332 in the clockwise direction moves the pawl actuator 324 in the clockwise direction with the tab 327 pivoting the pawl 321 in a counterclockwise direction to move the pawl into the path of the ratchet teeth to stop further rotation of the crankshaft 42 and handle 332 in that direction.

Drag actuation is effected by a knurled drag wheel 460 which is captured in and protrudes through a slot 462 beyond the outer surface of the reel body 20. The wheel 460 has a threaded bore and is suspended for rotation by a longitudinally directed bolt 466 extending through the spaced walls flanking the wheel 460.

The drag washer 210 has a substantially flat body 468 and has diametrically opposed tabs 470 bent perpendicularly in a common direction out of the plane of the body 468. The deck plate 21 has locating apertures for receiving each of the tabs 470. The one aperture is in direct alignment with the bolt 466 suspending the drag wheel 460. The forward end 472 of the bolt is slotted and is accessible through the one aperture to receive the one tab 470 of the drag plate 210.

This arrangement of the drag plate 210 prohibits rotation of the bolt 466 as the drag wheel 460 is manipulated. As a result, rotation of the drag wheel effects fore or aft movement of the bolt 460 relative to the reel body 20. Rotation of the wheel in a first direction forces the tab 470 and drag washer forwardly increasing drag braking pressure on the spool 131. Retraction of the bolt 466 and reduction of the braking pressure is accomplished by rotation of the drag wheel 460 oppositely to the first direction.

The reel is provided with a bait clicker 474 seated in boss 482 and is manipulable by the user between engaged and unengaged positions, with silent reel operation occurring with the clicker 474 in the latter position. The bait clicker 474 consists of a body portion 476 having a bifurcated end with long and short legs, respectively 478,480.

Leg 478 is of a flexible construction and extends into engagement with the pinion gear 260. The end 488 of the clicker 474 rides over the teeth on the pinion gear 260 as the centershaft 251 is rotated and produces a clicking sound that is audible through the reel housing. The leg 478 will deform upon reverse rotation of the centershaft 251 (line retrieval) and will align to provide a softer clicking sound as occurs during forward rotation of the centershaft.

DESCRIPTION OF A PREFERRED EMBODIMENT

The details of a preferred embodiment of the invention of an improved anti-reverse assembly 330 and an improved control member 446 therefor is illustrated in FIGS. 2-8. The details of the pawl 321 are most clearly apparent from FIGS. 3, 7 and 8. The pawl 321, which is substantially planar, has an overall inverted L-shape with a pawl tooth 323 configured for mating engagement with the ratchet teeth 336 when the control member 446 of the anti-reverse mechanism is in the engaged position. A leg 502 of the pawl has one edge 500 which provides an operating surface for the manual anti-reverse control member 446, as will be described hereinafter. A pivot tab 322 protrudes outwardly of the leg 502 on an edge 534 opposite edge 500 and has a rounded nose 504 about which the pawl pivots. The pawl tooth 323 has the recess 328 in the edge thereof for receiving the tab 327 on the actuator 324. The heel 533 of the pawl is defined by the recess 328 and is in position to engage the tab 327 when the control member 446 pivots the pawl clockwise or to be engaged by the tab 327 when the actuator 324 is pivoted clockwise.

A rearwardly directed boss 506 is formed integrally with the deck plate to define a pocket or slot 510 (FIG. 3) to accommodate the pawl 321. That is, the boss 506 has laterally spaced walls 508 which cooperatively define the pocket or rectangular slot 510 (FIG. 3) for close reception of the pawl 321. A socket 512 is formed internally in the base of the pocket or slot 510, within which the rounded nose 504 of the pivot tab 322 is received. The depth of the slot 510 is chosen so that the operating edge 500 of the leg 502 protrudes beyond the edges 514 of the walls 508. The slot 510 also prevents the pawl 321 from rubbing the back face of the face gear 313 to reduce drag and noise which is typical with the prior art pawls. The upper edges 516 (FIG. 7) of the walls 508 are inclined so as not to interfere with the pawl actuator 324 during pivoting of the actuator 324 upon operation of the crankshaft 42. With the pawl situated in the pocket or slot 510, the control member 446 is assembled through the bore 448 for cooperative engagement therewith.

Figure 4:
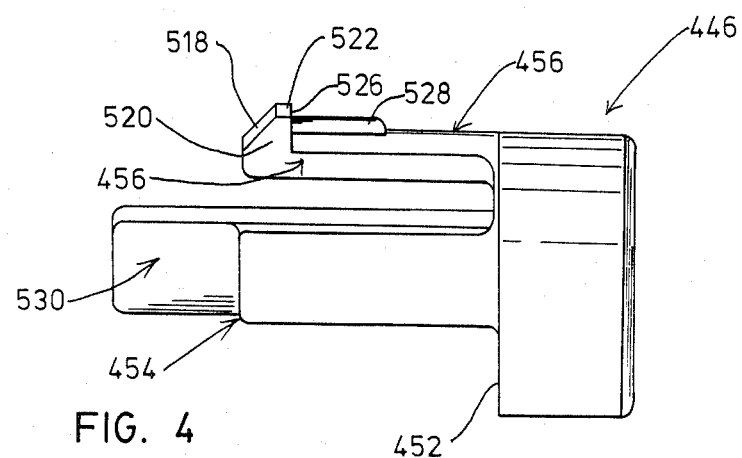
FIG. 4 is an enlarged, side elevation view of a preferred form of anti-reverse actuator for the reel in FIG. 1.
Figure 5:
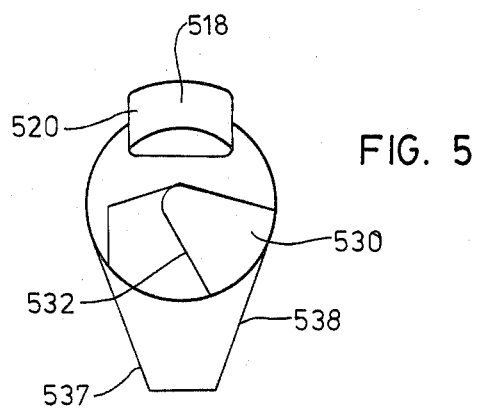
FIG. 5 is a left end elevation view of the actuator of FIG. 4.
Figure 6:
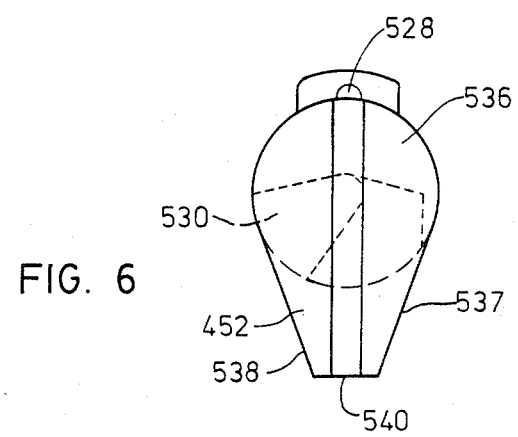
FIG. 6 is a right end elevation view of the actuator of FIG. 4.

The control member 446, detailed in FIGS. 4-6, consists of the externally situable and manually operable knob or head 452, and intergrally formed long and short legs 454,456, respectively. The shorter leg 456 serves primarily to lock the control member 446 in place on the reel. The long and short legs have outer surfaces that are rounded so as to cooperatively occupy a diameter substantially equal to that of the bore 448.

To assemble the control member 446 in the boss 450, the free ends of the legs 454,456 are introduced to the bore 448 from the outside of the housing. With the control member sufficiently extended in the bore, the outer edge of the reel body 20 about the bore 448 encounters a tapered ramp 518 formed by a lip 520 at the free end of the shorter leg 456. The ramp 518 progressively deflects the short leg 456 toward the longer and more rigid leg 454. With the lip 520 entirely within the bore 448, the radial outer edge 522 of the lip 520 guides the leg 456 through the bore as the control member 446 is longitudinally directed. In the fully seated position the boss 450 on the reel body will be captured closely between a flat inwardly facing surface 524 on the knob or head 452 and an outwardly facing shoulder 526 defined by the lip 520.

To amplify the binding force by the legs 454,456 within the bore 448, a longitudinally directed rib 528, having a rounded cross-section is formed on the outer surface of the short leg 456. The rib 528 urges the shorter leg 456 toward the longer leg, thereby biasing the longer leg against the walls of the boss within the bore 448.

The longer leg 454 has a stepped configuration. The cross-section of the leg is reduced radially inwardly from a point coinciding with the inner wall 458 (FIG. 3) of the boss 450, so as not to interfere with the edges 514 of the walls 508 about the slot 510, with the free end 530 of the leg 454 having a substantially triangular configuration in cross-section (FIG. 5). By providing a stepped construction, the rigidity of leg 454 is not compromised where it coincides with the boss 450. Further, the increased surface area of the leg 454 in contact with the walls of the bore 448 in the boss 450 represents an increased frictional force to inhibit unintentional rotation of the actuator 446. The free end 530 extends sufficiently to overlap or intersect the plane of the pawl 321 and is situated to act upon the pawl edge 500. More specifically, with the control member 446 fully in its most clockwise position, as viewed in FIG. 7, one face 532 on the free end 530 flushly engages the edge 500 of the leg 502 of the pawl to hold the pawl tooth 323 out of engagement with the ratchet, i.e. disengaged. In the disengaged or "off" position of the anti-reverse assembly, an edge 534 of the leg 502 abuts the wall 536 at the bottom of the slot 510. The control member 446 maintains the pawl 321 in the disengaged position with a force greater than the holding force between the pawl actuator 324 and the crankshaft so that the position of the pawl is unaffected by movement of the crankshaft in either direction.

Figure 7:
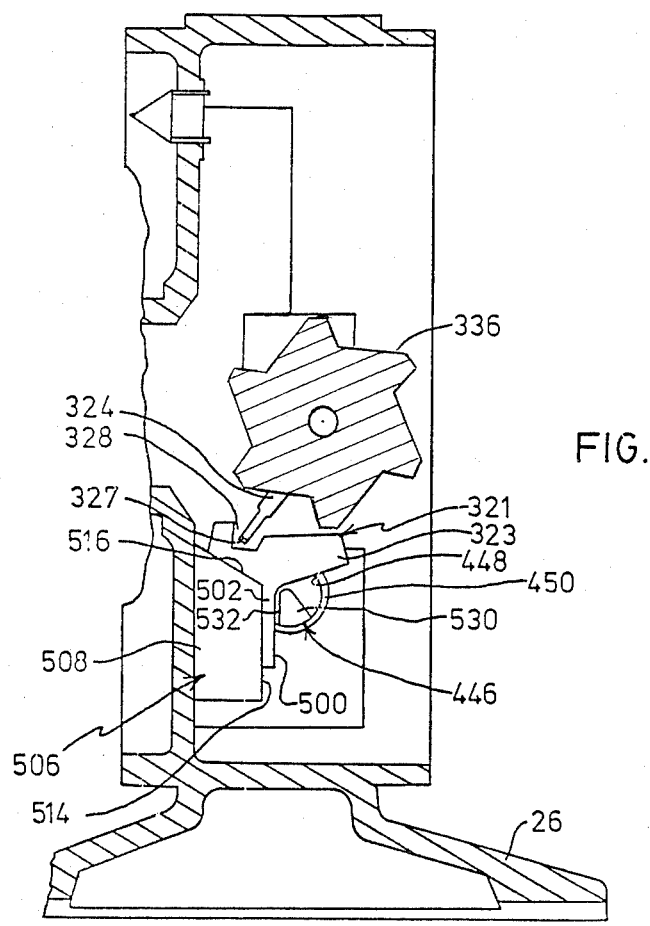
FIG. 7 is a fragmentary, side elevation view of the reel showing the anti-reverse mechanism in the disengaged or off position.

Counterclockwise rotation of the control member 446 from the FIG. 7 position to the FIG. 8 position, which is the "on" position, moves the face 532 of end 530 away from the edge 500 so as not to inhibit rotation of the pawl 321 through the force imparted by the pawl actuator 324. In the engaged or "on" position of the assembly, the pawl will assume the orientation of FIG. 8 upon reversing the crankshaft wherein the facing surface 531 on the heel 533 of the pawl is backed against a wall 535 defined by an undercut 537 in the deck plate 21, with the tooth 323 of the pawl engaged with the sprocket teeth 336 so as to prevent reverse or clockwise rotation of the crankshaft 42 as viewed in FIGS. 1 or 8. The crankshaft 42 may be rotated in the counterclockwise direction as viewed in FIGS. 1 or 8 without interference from the anti-reverse assembly. That is, the actuator 324 will pivot in a counterclockwise direction to pivot the pawl 321 out of the path of movement of the sprocket teeth 336.

The head 452 of the control member 446 has a rounded portion 536 with walls 537,538 converging towards a squared bottom 540. The head 452 is accommodated on the reel body 20 by a flat bottomed recess 542 (FIG. 2) having a curved upper portion with walls 544,546 diverging from top to bottom to mate selectively with one or the other of the walls 537,538 of the head 452. The walls 544,546 confine movement of the control member 446 between the engaged and disengaged positions for the anti-reverse mechanism 330. With the left wall 538 (as viewed in FIGS. 2 and 6) of control head 452 seated flushly with wall 546, the anti-reverse mechanism is in the "on" position and the pawl 321 is freed from the anti-reverse control member 446 and is responsive to movement of the pawl actuator 324.

It can be seen that assembly of the pawl 321 with the reel body is accomplished by simply locating the same within the mounting slot 510. Mounting of the control member 446 by a simple slip fit operation in the bore of boss 450 extends the free end 530 thereof into overlapping relationship with the pawl 321 in the pocket 510 to prevent the escape of the pawl 321 from the slot 510.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

I claim:

1. In a fishing reel having a housing with a deck plate, a rotatable crankshaft, a ratchet fixed on the crankshaft, a pivotable pawl movable between an engaged position with the ratchet to prevent reverse rotation of the crankshaft and a disengaged position wherein rotation of the crankshaft is uninhibited by the pawl, and a pawl actuating means frictionally carried on the crankshaft to pivot the pawl between the disengaged position upon forward rotation of the crankshaft and the engaged position upon reverse rotation of the crankshaft, the improvement comprising:
a slot defined in the deck plate for reception of the pawl; add
a rotatable anti-reverse control member extending through an opening in the housing and having a leg extending across the slot to block escape of the pawl from the slot, said leg directly engageable with the pawl,
the anti-reverse control member being rotatable between one position that holds the pawl disengaged from the ratchet and a second position that permits the pawl to be moved selectively from an engaged to a disengaged position from the ratchet.

2. The fishing reel of claim 1 wherein the pawl has a substantially planar configuration and the slot is defined by two spaced walls between which the pawl is located.

3. The fishing reel of claim 1 wherein the anti-reverse control means comprises a head portion with integrally connected first and second elongate legs, the first leg having a smaller cross-sectional area transverse to the length of the legs than the second leg, the first leg being deflected toward the second leg with the anti-reverse control member situated in the opening so that the second leg is biased against a wall of the opening to amplify friction forces to inhibit rotation of the anti-reverse control member within the opening.

4. The fishing reel of claim 3 wherein the pawl has a substantially planar configuration, the slot is defined by two spaced walls, and the second leg of the control member overlaps the plane of the pawl and is situated adjacent the pawl and across the slot between the two spaced walls to prohibit the escape of the pawl from the slot.

5. The fishing reel of claim 2 wherein the pawl has a tab with a rounded nose portion and the deck plate has a socket within the slot to receive the tab and permit pivoting of the pawl about the tab.

6. The fishing reel of claim 3 wherein the head of the control member has a flat, inwardly facing wall which seats against the reel housing and the first leg has an integrally formed lip spaced from the inwardly facing flat wall, the lip engaging the wall about the opening and guiding the first leg therethrough, the lip and flat wall cooperatively capturing the wall of the housing with the anti-reverse control memberin a fully seated position.

7. The fishing reel of claim 5 wherein the pawl has an edge and the second leg of the anti-reverse control member has a flat wall overlapping the plane of the pawl and engageable with the edge of the pawl.

8. The fishing reel of claim 7 wherein the second leg has a stepped construction defining a reduced cross-sectional portion, the reduced cross-sectional portion configured so as to prevent interference between the second leg and the walls defining the slot.

9. In a fishing reel of the type having a housing, a rotatable crankshaft extending laterally with respect to the reel, a ratchet carried by the crankshaft, a substantially flat pawl pivotable about a substantially laterally directed axis between an engaged position with the ratchet to prevent reverse rotation of the crankshaft and a disengaged position wherein the rotation of the crankshaft is uninhibited by the pawl, and pawl actuating means frictionally retained with the crankshaft to pivot the pawl to the disengaged position upon forward rotation of the crankshaft and the engaged position upon reverse rotation of the crankshaft, the improvement comprising:

a manually operable anti-reverse control member extensible through an opening intthe housing and having a head portion situable externally thereof;

means mounting the anti-reverse control member for rotation within the opening in the housing;

a leg integrally formed with the head portion and engageable directly with the pawl;

the anti-reverse control member being rotatably operable by manipulation of the head portion to move the leg between a first position with a surface of the leg in abutting relationship with the pawl and the pawl in the disengaged position and a second position in which the leg surface is moved away from the pawl and permits the pawl to follow the pawl actuator means to either the engaged or disengaged position depending upon the direction of rotation of the crankshaft;

the anti-reverse control member in the first position retaining the pawl in the disengaged position with a force greater than a force applied by the pawl actuator means upon rotation of the crankshaft so that the pawl will not follow the pawl actuator means into the engaged position when the crankshaft is reversibly rotated.

10. The fishing reel of claim 9 wherein the reel has a slot to accept the pawl, the pawl has an edge and the leg of the control member has a flat surface overlapping the plane of the pawl and engageable with the edge, said flat surface blocking the slot to prevent escape of the pawl from the slot.

11. The fishing reel of claim 9 wherein the leg has a substantially triangular cross-sectional configuration transverse to the length of the leg.

12. The fishing reel of claim 9 wherein the head portion of the anti-reverse control member has a rounded portion with integrally formed first and second walls converging away from the rounded portion and the reel housing has a recess to accommodate the head, said recess defined by a rounded portion and walls divergrng away from the rounded portion, said anti-reverse control member pivotable within the recess between the first position wherein the first wall of the anti-reverse actuator engages one of the walls of the recess and a second position wherein the second wall of the anti-reverse actuator engages another of the walls of the recess.

* * * * *